(12) United States Patent
Fujishiro et al.

(10) Patent No.: US 12,058,771 B2
(45) Date of Patent: Aug. 6, 2024

(54) COMMUNICATION CONTROL METHOD, USER EQUIPMENT, AND BASE STATION

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 352 days.

(21) Appl. No.: 17/399,899

(22) Filed: Aug. 11, 2021

(65) Prior Publication Data

US 2021/0378052 A1 Dec. 2, 2021

Related U.S. Application Data

(63) Continuation of application No. PCT/JP2020/005381, filed on Feb. 12, 2020.

(60) Provisional application No. 62/804,300, filed on Feb. 12, 2019.

(51) Int. Cl.
*H04W 4/00* (2018.01)
*H04W 76/20* (2018.01)
*H04W 76/38* (2018.01)

(52) U.S. Cl.
CPC ........... *H04W 76/38* (2018.02); *H04W 76/20* (2018.02)

(58) Field of Classification Search
CPC ...... H04W 76/38; H04W 76/20; H04W 76/27
USPC ........................................................ 370/329
See application file for complete search history.

(56) References Cited

U.S. PATENT DOCUMENTS

| | | | | |
|---|---|---|---|---|
| 8,315,194 | B2* | 11/2012 | Jeong | H04W 76/38 455/574 |
| 8,902,830 | B2* | 12/2014 | Nimbalker | H04W 52/0206 370/329 |
| 8,964,678 | B2* | 2/2015 | Anderson | H04W 72/04 370/329 |
| 8,964,679 | B2* | 2/2015 | Anderson | H04L 1/1812 370/329 |
| 9,204,354 | B2* | 12/2015 | Chen | H04W 36/32 |
| 9,215,656 | B2* | 12/2015 | Pecen | H04W 52/0216 |
| 9,258,804 | B2* | 2/2016 | Kato | H04W 72/21 |
| 9,445,261 | B2* | 9/2016 | Yi | H04W 12/02 |
| 9,609,502 | B2* | 3/2017 | Xiong | H04W 8/005 |
| 9,743,396 | B2* | 8/2017 | Anderson | H04W 76/30 |
| 9,820,328 | B2* | 11/2017 | Zhu | H04W 76/25 |
| 9,942,940 | B2* | 4/2018 | Ohta | H04W 76/27 |
| 10,321,294 | B2* | 6/2019 | Chatterjee | H04L 5/14 |
| 10,541,776 | B2* | 1/2020 | Ryu | H04L 1/08 |
| 10,638,536 | B2* | 4/2020 | Suzuki | H04W 72/23 |
| 10,645,649 | B2* | 5/2020 | Qi | H04W 52/0229 |
| 10,694,574 | B2* | 6/2020 | Lee | H04W 76/27 |
| 10,897,790 | B2* | 1/2021 | Velev | H04W 8/24 |

(Continued)

FOREIGN PATENT DOCUMENTS

WO 2017/199789 A1 11/2017

*Primary Examiner* — Amancio Gonzalez
(74) *Attorney, Agent, or Firm* — Studebaker & Brackett PC

(57) ABSTRACT

A communication control method according to one embodiment is a method in a mobile communication system. A communication control method includes predicting, by a user equipment in an RRC connected mode, in a case where the user equipment determines that there is no data to be communicated with a base station, a duration for which a state in which there is no such data persists, and transmitting, by the user equipment, a control signal to the base station, the control signal including an indicator identifying the duration that is predicted.

7 Claims, 9 Drawing Sheets

(56) References Cited

U.S. PATENT DOCUMENTS

| | | | |
|---|---|---|---|
| 11,026,286 B2* | 6/2021 | Lee | H04W 76/27 |
| 11,096,079 B2* | 8/2021 | Zhang | H04W 52/0229 |
| 11,350,445 B2* | 5/2022 | Fujishiro | H04W 72/23 |
| 11,523,455 B2* | 12/2022 | Ohta | H04W 76/27 |
| 11,638,257 B2* | 4/2023 | Määttänen | H04W 24/10 |
| | | | 455/431 |
| 11,716,754 B2* | 8/2023 | Fujishiro | H04W 74/0833 |
| | | | 370/329 |
| 2013/0316720 A1* | 11/2013 | Dwyer | H04W 52/0206 |
| | | | 455/450 |
| 2014/0092799 A1 | 4/2014 | Jain et al. | |
| 2016/0088678 A1* | 3/2016 | Sridharan | H04W 76/27 |
| | | | 455/452.1 |
| 2017/0099660 A1* | 4/2017 | Oh | H04L 5/0064 |
| 2018/0220486 A1* | 8/2018 | Tseng | H04W 36/305 |
| 2019/0306917 A1 | 10/2019 | Takahashi et al. | |
| 2020/0178217 A1* | 6/2020 | Huang | H04W 76/27 |
| 2020/0245334 A1* | 7/2020 | Phuyal | H04L 1/1825 |
| 2021/0176762 A1* | 6/2021 | Islam | H04B 7/0626 |
| 2023/0337274 A1* | 10/2023 | Fujishiro | H04W 74/002 |
| | | | 370/329 |

* cited by examiner

COMMUNICATION CONTROL METHOD, USER EQUIPMENT, AND BASE STATION

RELATED APPLICATIONS

The present application is a continuation based on PCT Application No. PCT/JP2020/005381, filed on Feb. 12, 2020, which claims the benefit of U.S. Provisional Patent Application No. 62/804,300 filed on Feb. 12, 2019. The content of which is incorporated by reference herein in their entirety.

TECHNICAL FIELD

The present disclosure relates to a communication control method, a user equipment, and a base station in mobile communication systems.

BACKGROUND ART

Currently, in the 3rd Generation Partnership Project (3GPP) which is a standardization project for mobile communication systems, as modes for Radio Resource Control (RRC) for a user equipment, an RRC connected mode, an RRC inactive mode, and an RRC idle mode have been specified.

The RRC connected mode and the RRC inactive mode are modes in which an RRC connection for a user equipment is established. However, the RRC inactive mode is a mode in which an established RRC connection is suspended. The RRC idle mode is a mode in which an RRC connection for the user equipment is not established.

The user equipment in the RRC idle mode or the RRC inactive mode needs to monitor a downlink control channel only in a periodic paging occasion, and thus, a power consumption of the user equipment is small. On the other hand, the user equipment in the RRC connected mode needs to frequently monitor at least the downlink control channel in order to perform data communication, and the power consumption of the user equipment is large.

Thus, there is a demand to realize a technique in which a user equipment can appropriately transition from an RRC connected mode to an RRC idle mode or an RRC inactive mode in order to reduce the power consumption of the user equipment.

SUMMARY OF INVENTION

A communication control method according to one embodiment is a method includes transmitting, by a user equipment in a Radio Resource Control (RRC) connected mode, a control signal to the base station, the control signal including information for specifying communication stoppage duration for which a state in which there is no data to be communicated with the base station persists, the infromation selected by the user equipment.

A user equipment according to one embodiment is an apparatus includes a controller configured to transmit in a Radio Resource Control (RRC) connected mode, a control signal to the base station, the control signal including information for specifying communication stoppage duration for which a state in which there is no data to be communicated with the base station persists, the infromation selected by the user equipment.

A chipset according to one embodiment is for controlling a user equipment. The chipset comprises: a processor and a memory coupled to the processor. The processor is configured to execute a process of: transmitting in a Radio Resource Control (RRC) connected mode, a control signal to the base station, the control signal including information for specifying communication stoppage duration for which a state in which there is no data to be communicated with the base station persists, the infromation selected by the user equipment

DESCRIPTION OF EMBODIMENTS

A mobile communication system according to an embodiment will be described with reference to the drawings. In the description of the drawings, the same or similar parts are designated with the same or similar reference signs.

Configuration of Mobile Communication System

First, a configuration of a mobile communication system according to an embodiment will be described. While the mobile communication system according to one embodiment is a 3GPP 5G system, Long Term Evolution (LTE) may be at least partially applied to the mobile communication system.

Figure 1:
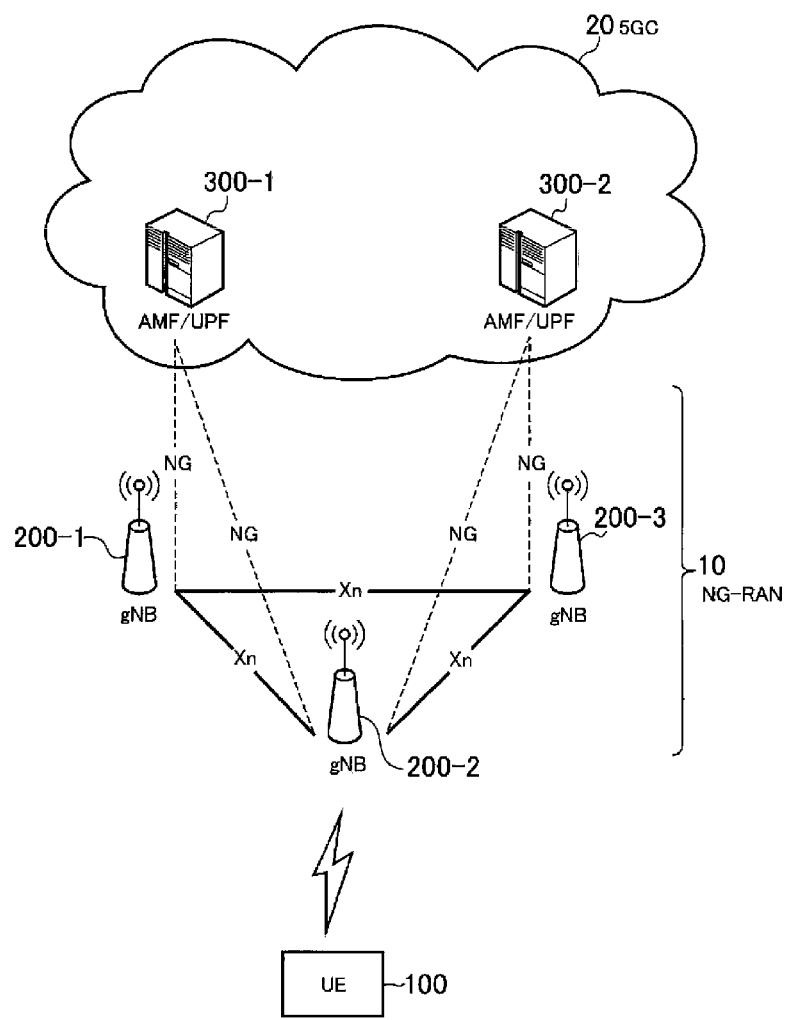
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base station interface. The gNB 200 manages one or more cells. The gNB 200 performs radio communication with the UE 100 that has established a connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource for performing radio communication with the UE 100. One cell belongs to one carrier frequency.

Note that a gNB may be connected to an Evolved Packet Core (EPC) which is an LTE core network, or an LTE base station may be connected to a 5GC. Moreover, the LTE base station may be connected to the gNB via the inter-base station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
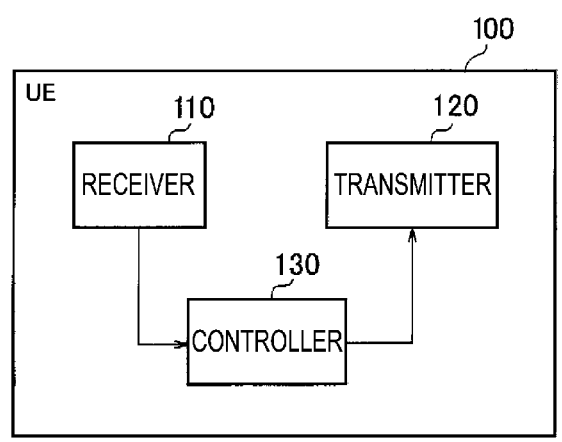
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various types of transmission under control of the controller 130. The transmitter 120 includes the antenna and a transmitting unit. The transmitting unit converts the baseband signal (transmission signal) output by the controller 130 into a radio signal and transmits the signal from the antenna.

The controller 130 performs various types of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of process.

Figure 3:
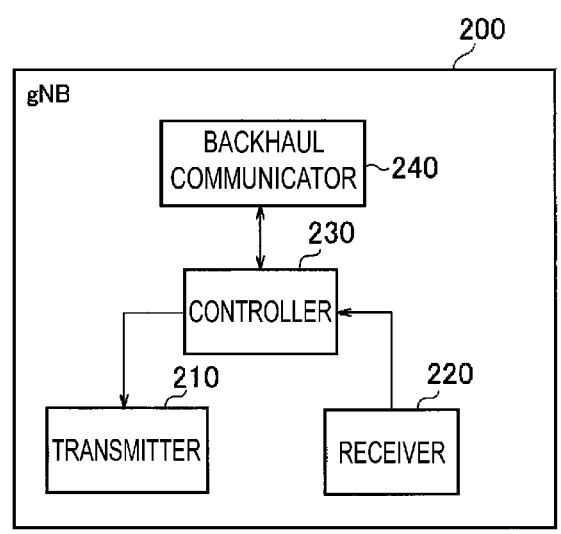
FIG. 3 is a diagram illustrating a configuration of a base station according to the embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of process.

The backhaul communicator 240 is connected to a neighboring base station via the inter-base station interface. The backhaul communicator 240 is connected to the AMF/UPF 300 via the base station to core network interface. Note that the gNB may include a Central Unit (CU) and a Distributed Unit (DU) (i.e., may be functionally divided), and both units may be connected to each other via an F1 interface.

Figure 4:
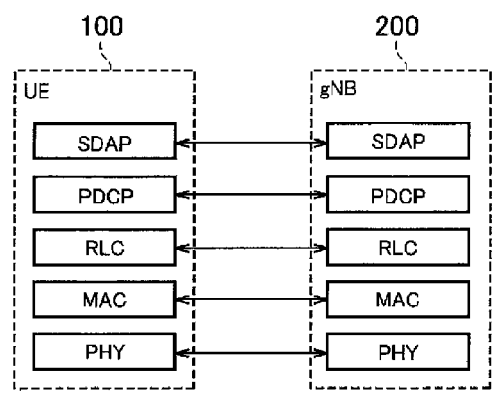
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by hybrid ARQ (HARQ), a random access procedure, or the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit by which the core network performs QoS control and a radio bearer that is a unit by which an Access Stratum (AS) performs QoS control. Note that in a case where a RAN is connected to the EPC, SDAP is not necessary.

Figure 5:
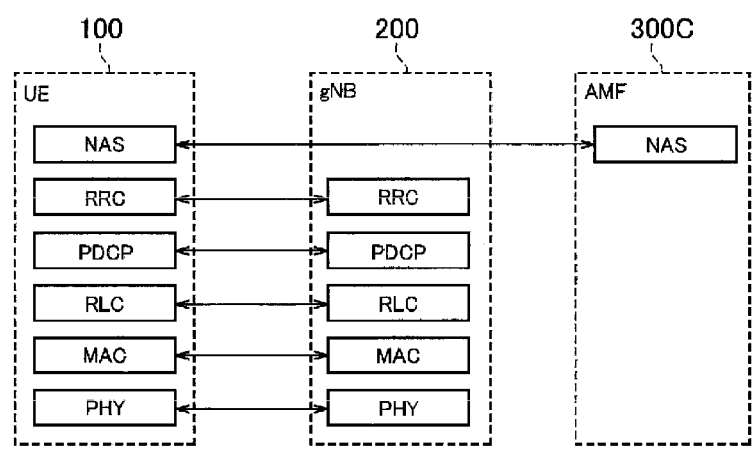
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is a connection (RRC connection) between the RRC of the UE 100 and the RRC of the gNB 200, the UE 100 is in an RRC connected mode. In a case where there is no connection (RRC connection) between the RRC of the UE 100 and the RRC of the gNB 200, the UE 100 is in an RRC idle mode. In a case where the RRC connection is suspended, the UE 100 is in an RRC inactive mode.

The NAS layer located higher than the RRC layer performs session management, mobility management, and the like. NAS signaling is transmitted between the NAS layer of the UE 100 and the NAS layer of the AMF 300.

Note that the UE 100 includes an application layer or the like other than the radio interface protocol.

Operations of Mobile Communication System

The RRC connected mode and the RRC inactive mode are modes in which an RRC connection for the UE 100 is established. However, the RRC inactive mode is a mode in which an established RRC connection is suspended. Specifically, in the RRC inactive mode, context information for the UE 100 is retained in the gNB 200 and the UE 100, and thus, smooth transition to the RRC connected mode can be achieved using the retained context information. The RRC idle mode is a mode in which an RRC connection for the UE 100 is not established.

The UE 100 in the RRC idle mode or the RRC inactive mode needs to monitor a downlink control channel only in a cyclic paging occasion, and thus, power consumption of the UE 100 is small. On the other hand, the UE 100 in the RRC connected mode needs to frequently monitor at least the downlink control channel in order to perform data communication, and the power consumption of the UE 100 is large.

In the following, a description is given of operations to allow the UE 100 to appropriately transition from the RRC connected mode to the RRC idle mode or the RRC inactive mode in order to reduce the power consumption of the UE 100.

Figure 6:
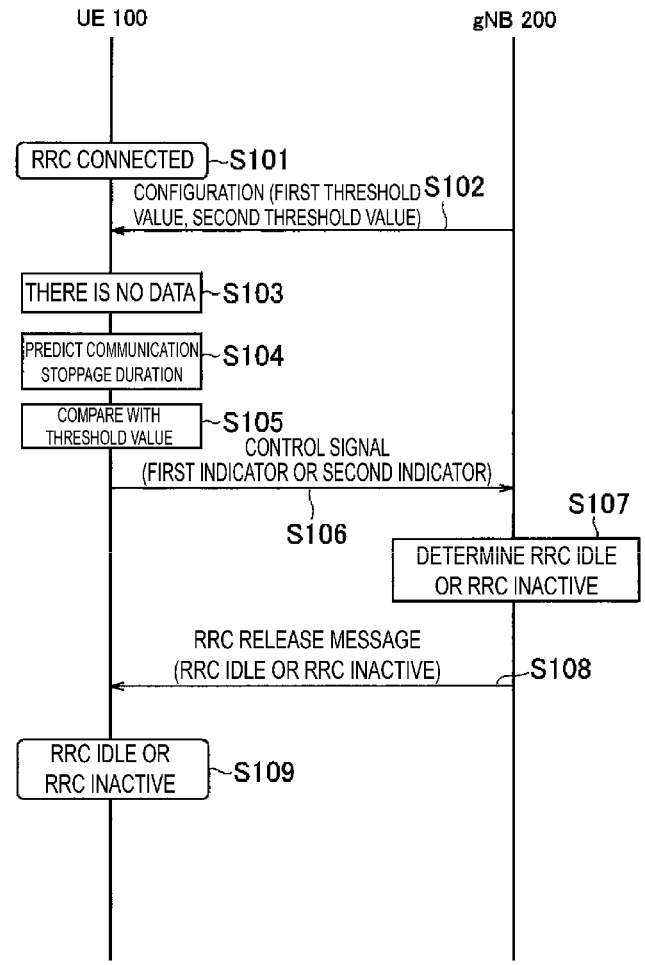
FIG. 6 is a diagram illustrating operations of a mobile communication system according to the embodiment.

FIG. 6 is a diagram illustrating operations of a mobile communication system according to the embodiment.

As illustrated in FIG. 6, in step S101, the UE 100 is in the RRC connected mode in a cell of the gNB 200. The UE 100 in the RRC connected mode performs data communication with the gNB 200. The UE 100 transmits uplink data to the gNB 200 via a Physical Uplink Shared Channel (PUSCH), and receives downlink data from the gNB 200 via a Physical Downlink Shared Channel (PDSCH).

In step S102, the gNB 200 configures a threshold value for the UE 100. The threshold value defines a condition under which the UE 100 transmits an indicator to the gNB 200, the indicator indicating that there is no data to be communicated with the gNB 200. Such an indicator may be referred to as a Release Assistance Indicator (RAI).

The configuration in step S102 may be made by way of an RRC message transmitted and/or received in the RRC layer. The RRC message may be a dedicated message that is transmitted by UE-specific unicast transmission, or may be a common message (system information block) broadcast to a plurality of UEs within the cell.

The gNB 200 may configure a plurality of threshold values for the UE 100. For example, the gNB 200 transmits to the UE 100 an RRC message including a first threshold value and a second threshold value that is greater than the first threshold value. The first threshold value indicates, for example, a time length of approximately 10 seconds, and the second threshold value indicates, for example, a time length of approximately one minute. However, the number of threshold values is not limited to two, and may be three or more. When receiving the RRC message including the plurality of threshold values from the gNB 200, the UE 100 stores the plurality of threshold values included in the received RRC message.

The gNB 200 may configure activation of the indicator (RAI) transmission for the UE 100 in addition to the configuration of the threshold value. The gNB 200 may implicitly configure the activation of the indicator transmission for the UE 100. For example, the UE 100 may consider that the activation of the indicator transmission is configured when the threshold value is configured.

Instead of the gNB 200 configuring a plurality of threshold values for the UE 100, at least one of the plurality of threshold values may be configured in advance for the UE 100. For example, a threshold value defined by communication standards may be configured for the UE 100 in advance at the time of shipping the UE 100.

In step S103, the UE 100 determines that there is no longer any data (uplink data and/or downlink data) to be communicated with the gNB 200. For example, the UE 100 detects that a buffer for temporarily storing uplink data to be transmitted to the gNB 200 has become empty. The UE 100 may determine that there is no longer any data to be communicated with the gNB 200, based on information obtained from the application layer.

In step S104, the UE 100 predicts a duration (hereinafter referred to as "communication stoppage duration") for which a state in which there is no data (uplink data and/or downlink data) to be communicated with the gNB 200 persists. For example, the UE 100 predicts the communication stoppage duration, based on the information obtained from the application layer. The UE 100 may acquire, from the application, information indicating when data, which is to be transmitted by the application to the network next time, will be generated and/or information indicating when data, which is to be received by the application from the network next time, will be generated, and may predict the communication stoppage duration, based on the acquired information. The UE 100 may statistically learn past communication stoppage durations in order to predict the communication stoppage duration, based on the learning result.

In step S105, the UE 100 compares the communication stoppage duration predicted in step S104 with the plurality of threshold values.

In step S106, the UE 100 transmits a control signal including the indicator to the gNB 200, based on the result of comparing the communication stoppage duration and the plurality of threshold values. The gNB 200 receives the control signal including the indicator from the UE 100.

The control signal is a buffer status report transmitted and received in the MAC layer. The buffer status report is a type of MAC Control Element (CE). The indicator may be a buffer size value included in the buffer status report. In this case, the UE 100 transmits the buffer status report including the buffer size value in accordance with the predicted duration to the gNB 200.

Alternatively, the control signal is an RRC message transmitted and received in the RRC layer. The indicator may be an information element (IE) included in the RRC message. In this case, the UE 100 transmits an RRC message including an information element depending on the predicted duration to the gNB 200.

Figure 7:
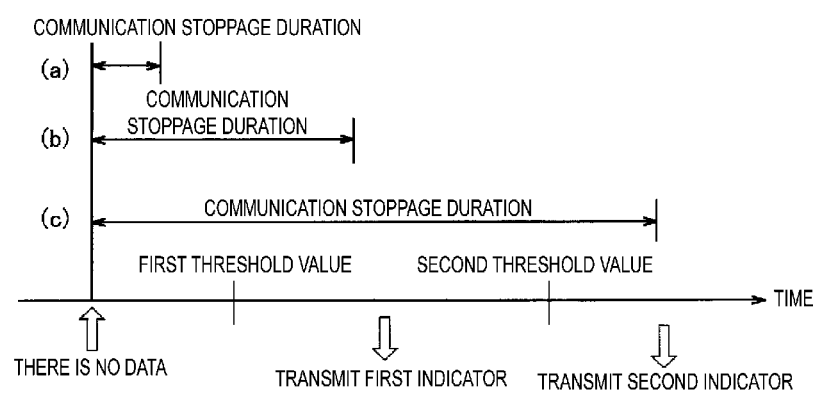
FIG. 7 is a diagram illustrating a specific example of steps S105 and S106 in FIG. 6.

FIG. 7 is a diagram illustrating a specific example of steps S105 and S106 in FIG. 6. FIG. 7 illustrates an example in which the first threshold value and the second threshold value that is greater than the first threshold value are configured for the UE 100.

As illustrated in FIG. 7(*a*), in a case where the communication stoppage duration predicted in step S104 is less than the first threshold value, the UE 100 does not transmit the control signal including the indicator (RAI) to the gNB 200. In a case where the data communication stoppage is temporary and the data communication is resumed soon, the UE 100 preferably maintains the RRC connected mode. Therefore, in the case where the communication stoppage duration predicted in step S104 is less than the first threshold value, the UE 100 does not transmit the indicator (RAI) to the gNB 200.

As illustrated in FIG. 7(*b*), in a case where the communication stoppage duration predicted in step S104 is equal to or more than the first threshold value and less than the second threshold value, the UE 100 transmits a control signal including a first indicator as the indicator (RAI) to the gNB 200.

As illustrated in FIG. 7(*c*), in a case where the communication stoppage duration predicted in step S104 is equal to or more than the second threshold, the UE 100 transmits a control signal including a second indicator, which is different from the first indicator, as the indicator (RAI) to the gNB 200.

In this manner, in an embodiment, a plurality stages of indicators are introduced so that the gNB 200 can know the length of the communication stoppage duration.

In a case where the control signal in step S106 is a buffer status report, for example, the first indicator may indicate "BSR=0" and the second indicator may indicate "BSR=−1". "BSR=0" indicates that the uplink data in the UE 100 buffer is zero. "BSR=−1" is not limited to "−1" but may be any value as long as it is a newly added buffer size value. Alternatively, the buffer size value to be used as the first indicator and the second indicator may be configured (specified) by the gNB 200 for the UE 100. This configuration may be made in step S102.

In a case where the control signal in step S106 is an RRC message, for example, the first indicator may indicate "RAI_LOW" and the second indicator may indicate "RAI_HIGH". Alternatively, the first indicator may indicate "the first threshold value is satisfied" and the second indicator may indicate "the second threshold value is satisfied".

As illustrated in FIG. 6, in step S107, the gNB 200 determines whether to make the UE 100 transition to the RRC idle mode or the RRC inactive mode, based on the indicator included in the control signal received from the UE 100. In an embodiment, in a case where the indicator included in the control signal received from the UE 100 is the first indicator, the gNB 200 determines to make the UE 100 transition to the RRC inactive mode. On the other hand, in a case where the indicator included in the control signal received from the UE 100 is the second indicator, the gNB 200 determines to make the UE 100 transition to the RRC idle mode.

In step S108, the gNB 200, based on a result of the determination in step S107, transmits an RRC release message which is a type of dedicated RRC message to the UE 100. In a case where the gNB 200 determines to make the UE 100 transition to the RRC inactive mode, the gNB 200 includes configuration information for the RRC inactive mode (SuspendConfig) in the RRC release message. SuspendConfig includes ran-PagingCycle which is a discontinuous reception (DRX) cycle for the RRC inactive mode, and fullI-RNTI or shortI-RNTI which is an identifier assigned to the UE 100 for the RRC inactive mode. On the other hand, in a case where the gNB 200 determines to make the UE 100 transition to the RRC idle mode, the gNB 200 does not include SuspendConfig in the RRC release message.

In step S109, the UE 100, based on the RRC release message received from the gNB 200, transitions to the RRC idle mode or the RRC inactive mode. Specifically, the UE 100 transitions to the RRC inactive mode in a case where the RRC release message includes SuspendConfig, or the RRC idle mode in a case where the RRC release message does not include SuspendConfig.

In this manner, according to an embodiment, since the gNB 200 is able to know the length of the communication stoppage duration, the gNB 200 can configure the appropriate mode of the RRC idle mode and the RRC inactive mode for the UE 100 in accordance with the communication stoppage duration.

MODIFICATION 1

In the above-described embodiment, in the case where the control signal in step S106 is an RRC message, the value indicating the communication stoppage duration predicted in step S104 may be included as an indicator in the RRC message. For example, the indicator as the value indicating the communication stoppage duration may be selected from among previously defined candidates such as 1 s, 5 s, 10 s, 15 s, 30 s, 60 s, . . . , 1 h, . . . , 1 day. Moreover, the predicted communication stoppage duration value is not limited to being selected from among the predetermined candidates and may itself be included as an indicator in the RRC message.

In this case, the threshold configuration (step S102) and the threshold comparison (step S105) may not be required. Alternatively, one threshold may be configured by the gNB 200 for the UE 100 (step S102) as a transmission trigger condition for an RRC message including such an indicator.

Instead of the RRC message, a new MAC CE may be introduced, and the MAC CE including the indicator indicating the communication stoppage duration may be transmitted from the UE 100 to the gNB 200 (step S106).

MODIFICATION 2

In the above-described embodiment and Modification 1 thereof, the UE 100 determines that there is no data to be communicated with the gNB 200 (step S103), and thereafter, transmits the control signal including the indicator (RAI) to the gNB 200 (step S106).

However, in the case where there is data to be communicated with the gNB 200, the UE 100 may determine that there will be no data to be communicated with the gNB 200 in the future. In this case, the control signal including the indicator (RAI) may be transmitted to the gNB 200 (step S106) before there is no more data to be actually communicated with the gNB 200.

Figure 8:
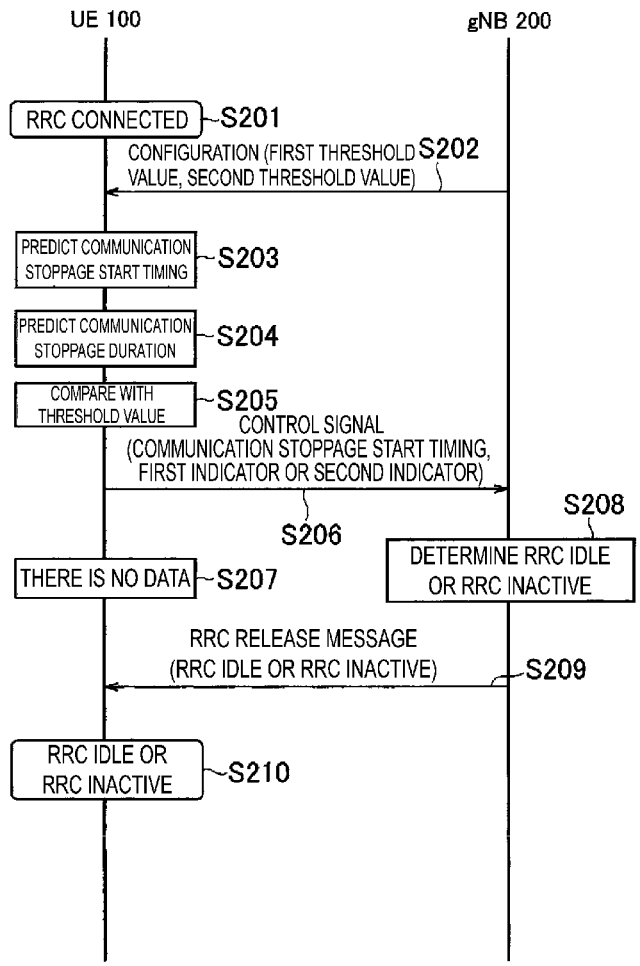
FIG. 8 is a diagram illustrating operations of a mobile communication system according to Modification 2 of the embodiment.

FIG. 8 is a diagram illustrating operations of a mobile communication system according to Modification 2 of the embodiment. Here, the operations of the above-described embodiment are assumed and the differences from the operations will be mainly described; however, the operations of Modification 1 described above may also be assumed.

As illustrated in FIG. 8, steps S201 and S202 are similar to steps S101 and S102 in FIG. 6.

In step S203, the UE 100 predicts a timing (hereinafter, referred to as a "communication stoppage start timing") at which there will be no data to be communicated with the gNB 200 in the future. The UE 100 may predict the communication stoppage start timing based on an amount of uplink data in the buffer of the UE 100, or may predict the communication stoppage start timing based on information obtained from the application layer. The communication stoppage start timing may be a timing at which transmission of data currently accumulated in the buffer (or data notified to the gNB 200 through the buffer status report) is completed.

In step S204, the UE 100 predicts the communication stoppage duration in a similar manner to the embodiment described above.

In step S205, the UE 100 compares the communication stoppage duration predicted in step S104 with the plurality of threshold values.

In step S206, the UE 100 transmits a control signal including an indicator to the gNB 200, based on a result of comparing the communication stoppage duration and the plurality of threshold values. The UE 100 further includes information for identifying the communication stoppage start timing predicted in step S203 in the control signal. The information for identifying the communication stoppage start timing may be information expressed in terms of an absolute time, or may be information expressed in terms of a relative time with respect to the transmission timing of the control signal. The information for identifying the communication stoppage start timing may be information expressed in terms of a remaining amount of data (uplink data and/or downlink data) to be communicated with the gNB 200.

In step S207, the UE 100 is, at the communication stoppage start timing, in a state where there is no data (uplink data and/or downlink data) to be communicated with the gNB 200.

In step S208, the gNB 200 determines whether to make the UE 100 transition to the RRC idle mode or the RRC inactive mode in a similar manner to the embodiment described above.

In step S209, the gNB 200 transmits an RRC release message to the UE 100, based on the communication stoppage start timing notified from the UE 100. For example, the gNB 200 transmits an RRC release message to the UE 100 at or immediately after the communication stoppage start timing.

Step S210 is similar to step S109 in FIG. 6.

Other Embodiments

In the embodiment described above, although the bearers are not distinguished from each other under the assumption that a plurality of bearers are configured for the UE 100, the gNB 200 may configure a threshold value for each bearer of the UE 100.

In this case, the gNB 200 may configure the threshold value associated with a bearer identifier for the UE 100. The UE 100 may notify the gNB 200 of the indicator (RAI) that is associated with the bearer identifier in addition to the threshold information.

This allows the gNB 200 to identify a bearer for which communication is not performed for a period of time through the RAI. For this reason, the gNB 200 can release only the identified bearer configuration, make a communication configuration suitable for a bearer other than the bearer, and hand over the UE 100 to the optimal cell or frequency, while maintaining the UE 100 in the RRC connected mode.

For example, the gNB 200 may release a bearer for high-speed communication, such as video reception, to release carrier aggregation configuration from the UE 100 and transfer the UE from a high frequency such as 3.5 GHz to a low frequency of 800 MHz. This allows the power consumption of the UE 100 to be reduced.

The embodiments above are described mainly for a 5G system (NR), but the operations according to the embodiments may be applied to LTE.

In the embodiments described above, the UE 100 may be a UE for a machine type communication application or an IoT application.

Note that a program causing a computer to execute each of the processes performed by the UE 100 or the gNB 200 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the UE 100 or the gNB 200 may be integrated to configure at least a portion of the UE 100 or the gNB 200 as a semiconductor integrated circuit (chipset, SoC).

An embodiment has been described above in detail with reference to the drawings; however, specific configurations are not limited to those described above, and various design modifications can be made without departing from the gist of the present disclosure.

Supplementary Note

Introduction

The RAN plenary approved the study on NR UE power savings, and the following was defined as an objective initiated by RAN2.

Study on extension of higher layer procedure for user equipment power savings a) Study on extension of the UE paging procedure based on additional power saving signal/channel/procedure b) Study on extension of the UE power saving procedure for supporting efficient transition from the RRC connected mode to the RRC idle mode/RRC inactive mode In this supplementary note, problems that may arise in the procedure of transitioning from the RRC connected mode to the RRC idle mode/inactive mode and the direction for solutions for UE power saving will be discussed.

Discussion

Figure 9:
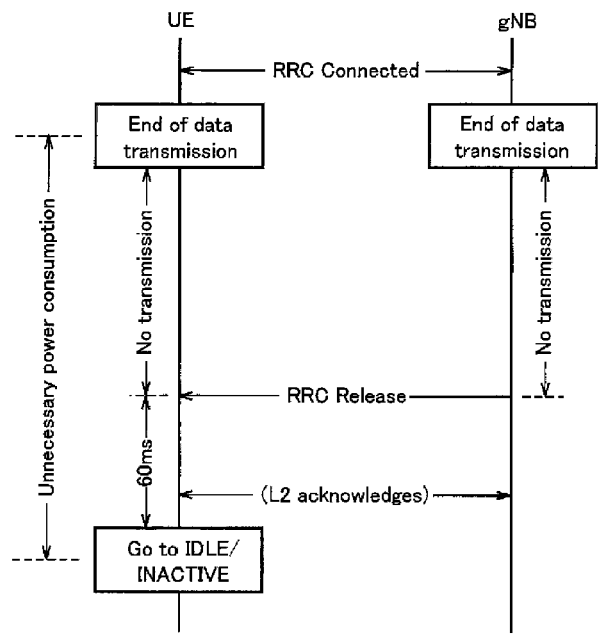
FIG. 9 is a diagram related to a supplementary note.

As illustrated in FIG. 9, even though the UE can already transition to the idle mode/inactive mode, unnecessary power consumption is caused when the UE remains in the connected mode. Such delay may include a period from the end of data transmission to the RRC release and a period from the reception of the RRC release to the start of the process of transition to the idle mode/inactive mode. Accordingly, in order to reduce the UE power consumption, it is desirable to minimize delay due to the UE unnecessarily maintaining the RRC connected mode.

Proposal 1: RAN2 should study a solution to minimize the period for which the UE unnecessarily maintains the RRC connected mode.

Concerning the former delay, after DL/UL data transmission is completed, the gNB is expected to transmit the RRC release as soon as possible. However, in a case where additional data arrives immediately after the RRC release, the UE needs to re-transition to the RRC connected mode. Such frequent back and forth transitions of the RRC state are undesirable. Accordingly, to better understand when to transmit the RRC release, it may be necessary for the gNB to know whether DL/UL will occur in the near future. In NB-IoT and eMTC, a Release Assistance Indication (RAI) was introduced to inform the eNB of whether the UE holds more data to transmit or receive in the near future by the UE transmitting BRS=0. As one possibility, NR may reuse the concept of RAI as in LTE today. However, in consideration that NR has additional functionality that is not available in LTE (e.g., an inactive state), some extension for existing RAI may be required. Details may be discussed later.

Proposal 2: RAN2 should agree to adopt the concept of Release Assistance Indication (RAI) as a baseline, and the details and possibilities of extension should be further studied.

Concerning the latter delay discussed above, in the current specification, the UE delays the process to transition to the idle mode/inactive mode by 60 milliseconds after the reception of the RRC release message, or optionally, the UE transitions to the idle mode/inactive mode by the acknowledgment of the message from the lower layer. For this purpose, the 60 millisecond delay in LTE takes into account L2 acknowledgment, that is, RLC status reporting and HARQ ACK. This processing delay of the RRC connection release continues from Rel-8, so it should be reviewed if it can be applied to NR. For example, the extended RRC release message can instruct the UE to transition to the idle mode/inactive mode only in a case where the data transmission is terminated (e.g., in a case of a conditional RRC release). Details and other solutions should be further studied.

Finding 1: Currently, the UE does not transition to the idle mode immediately after receiving the RRC release. That is, the UE stands by for 60 milliseconds, or waits for the acknowledgment from the lower layer.

Proposal 3: RAN2 should study a solution to minimize the delay in receiving the RRC release.

The invention claimed is:

1. A communication control method comprising:
   determining by a user equipment, a length of a communication stoppage duration in which there is no data to be communicated with a base station; and
   transmitting, by the user equipment in a Radio Resource Control (RRC) connected mode, a control signal to the base station, the control signal including information for specifying the length of the communication stoppage duration determined by the user equipment.

2. The communication control method according to claim 1, further comprising:
   transmitting, by the user equipment, the control signal including information used for determining, by the base station, RRC mode.

3. The communication control method according to claim 1, further comprising:
   transmitting, by the user equipment, the control signal including information used for determining, by the base station, a RRC mode of the user equipment to a RRC inactive mode, and
   the RRC inactive mode is a mode in which the RRC connection is suspended.

4. A user equipment comprising:
   a controller configured to:
      determine a length of a communication stoppage duration in which there is no data to be communicated with a base station; and
      transmit in a Radio Resource Control (RRC) connected mode, a control signal to the base station, the control signal including information for specifying the length of the communication stoppage duration determined by the user equipment.

5. A chipset for controlling a user equipment, the chipset comprising:
   a processor and a memory coupled to the processor, the processor configured to execute a process of:
      determining a length of a communication stoppage duration in which there is no data to be communicated with a base station; and
      transmitting in a Radio Resource Control (RRC) connected mode, a control signal to the base station, the control signal including information for specifying the length of the communication stoppage duration determined by the user equipment.

6. A non-transitory computer-readable medium comprising, stored thereupon, computer program instructions for execution by a user equipment, the program instructions being configured to cause the user equipment to execute processing of:
   determining a length of a communication stoppage duration in which there is no data to be communicated with a base station; and
   transmitting in a Radio Resource Control (RRC) connected mode, a control signal to the base station, the control signal including information for specifying the length of the communication stoppage duration determined by the user equipment.

7. A system comprising:
   a user equipment is configured to:
   determine a length of a communication stoppage duration in which there is no data to be communicated with a base station; and
   transmit in a Radio Resource Control (RRC) connected mode, a control signal to the base station, the control signal including information for specifying the length of the communication stoppage duration determined by the user equipment.

* * * * *